United States Patent
Homburg

[19]
[11] Patent Number: 6,095,254
[45] Date of Patent: Aug. 1, 2000

[54] DEVICE AND METHOD FOR DETECTING CULTIVATION BOUNDARIES AND OTHER GUIDE VARIABLES

[75] Inventor: Helmut Homburg, Harsewinkel, Germany

[73] Assignee: Claas Selbstfahrende Erntemaschinen GmbH, Harsewinkel, Germany

[21] Appl. No.: 09/163,843

[22] Filed: Sep. 30, 1998

[30] Foreign Application Priority Data

Oct. 4, 1997 [DE] Germany .................. 197 43 884

[51] Int. Cl.$^7$ .................................................. A01B 63/00
[52] U.S. Cl. .................. 172/6; 172/5; 56/10.2 F
[58] Field of Search ............... 172/2, 4, 4.5, 5; 56/10.2 F, 10.2 R; 701/50, 41

[56] References Cited

U.S. PATENT DOCUMENTS

| | | | |
|---|---|---|---|
| 5,019,983 | 5/1991 | Schutten et al. ................ | 56/10.2 F |
| 5,410,479 | 4/1995 | Coker . | |
| 5,430,654 | 7/1995 | Kyrtsos et al. . | |
| 5,509,486 | 4/1996 | Anderson ........................ | 172/5 X |
| 5,528,888 | 6/1996 | Miyamoto et al. .............. | 56/10.2 F |
| 5,612,864 | 3/1997 | Henderson . | |
| 5,666,792 | 9/1997 | Mullins ........................... | 172/2 X |
| 5,715,665 | 2/1998 | Diekhans et al. . | |
| 5,715,666 | 2/1998 | Huster et al. . | |
| 5,782,072 | 7/1998 | Matthews ........................ | 56/10.2 F |
| 5,794,421 | 8/1998 | Maichle ........................... | 56/10.2 E |
| 5,828,971 | 10/1998 | Dickhans et al. .............. | 56/10.2 F |

FOREIGN PATENT DOCUMENTS

| | | | |
|---|---|---|---|
| 0 723 740 A1 | 7/1996 | European Pat. Off. ....... | A01D 41/12 |
| 24 55 836 C3 | 8/1976 | Germany ........................ | A01D 41/12 |
| 33 00 086 A1 | 7/1984 | Germany ........................ | B60Q 9/00 |
| 264 366 A1 | 11/1986 | Germany ........................ | A01B 41/06 |
| 36 38 134 A1 | 5/1988 | Germany ........................ | A01D 27/04 |
| 40 04 247 A1 | 8/1991 | Germany ........................ | A01B 69/00 |
| 43 07 408 A1 | 11/1993 | Germany ........................ | G01S 17/02 |
| 43 18 798 A1 | 6/1994 | Germany ........................ | G05D 1/02 |
| 43 22 293 A1 | 1/1995 | Germany ........................ | A01C 17/00 |
| 195 08 941 | 3/1995 | Germany . | |
| 195 08 942 | 3/1995 | Germany . | |
| 44 45 464 A1 | 7/1995 | Germany ........................ | G01B 11/14 |
| 195 08 944 A1 | 9/1996 | Germany ........................ | A01B 69/00 |
| 195 18 058 A1 | 12/1996 | Germany ........................ | A01M 7/00 |
| 197 19 939 | 5/1997 | Germany . | |
| 197 26 917 | 6/1997 | Germany . | |
| 1 582 415 | 1/1981 | United Kingdom ............ | G01S 5/00 |

*Primary Examiner*—Victor Batson
*Attorney, Agent, or Firm*—Husch & Eppenberger, LLC; Robert E. Muir; Richard J. Musgrave

[57] ABSTRACT

A device and method is disclosed for detection of cultivation boundaries or guide variables which are evaluated for an automatic steering system on agricultural machines. Electromagnetic waves emitted by a transmitter in the working direction of the machine are used. Several boundary-specific variables are determined from the reflection of the electromagnetic wave and from them is derived a control difference for a steering regulator.

The device is mounted on the individual implements in the vicinity of the cultivation boundary and arranged in such a way that the cultivation boundary is detected before cultivation. Using a device, in the embodiment of a scanner, which works with electromagnetic waves, and evaluating several cultivation boundary-specific guide variables contained in the reflection, results in the successful contactless detection all cultivation boundaries or guide variables existing in agriculture. Further, evaluation methods for detecting different cultivation boundaries or guide variables are automatically selected with the aid of an appropriate selection method.

36 Claims, 4 Drawing Sheets

DEVICE AND METHOD FOR DETECTING CULTIVATION BOUNDARIES AND OTHER GUIDE VARIABLES

BACKGROUND OF THE INVENTION

The present invention relates generally to agricultural machinery and, more particularly, to improvements to means and methods for detecting cultivation boundaries or other guide variables. The invention concerns contactless detection that may be used to guide the agricultural machine.

An apparatus of this kind is known from German Patent 2 455 836. The apparatus disclosed therein features a transmitting and receiving unit which detects an edge of crop material in the front of the agricultural machine, in the direction of travel, without contact and at an acute angle to the crop. The reflection signal generates a steering signal by several different evaluation methods. The transmitting unit works with narrow-band light sources, such as polarizers and modulators, and short-wave highly focused electromagnetic waves or sound waves. The reflected signals are compared with a nominal value and fed to an automatic steering device. Consequently, the lateral distance between the edge of the cutting mechanism and the edge of crop material is minimized. To detect the edge even more precisely, the apparatus is periodically pivoted about an approximately vertical axis and generates the position of the edge corresponding to a nominal value, based upon the average of the reception signals.

The disadvantages of this apparatus include the mounting on the machine and the method for evaluating the sensor signals. The layout of the disclosed apparatus is suitable only to a limited extent for detecting the edge of a standing crop. The scanning beam is reflected laterally by the edge of the standing crop and the distance from the edge is determined from the received signal. Unevenness of the ground or reduced height of the standing crop may cause the apparatus to determine the distance from the ground or above the standing crop, rather than from the crop edge, requiring fine adjustment and exact maintenance of the scanning location at the edge. These measures are very expensive. Variable quantities known in the art such as the height of standing crop, the working height, variations in inclination of the machine and terrain, together or individually, significantly influence the signal received.

An alternative disclosed evaluation means may be selected to improve the evaluation, wherein the transmitter is pivoted about a vertical axis. However, such an apparatus works satisfactorily only when the degree of reflection is constant at and around an edge of the standing crop. Such optimum working conditions are rare and hence a satisfactory work result is rarely achieved.

When the apparatus is used for different types of edges or cultivation boundaries, where the same reflection conditions prevail on both sides of the boundaries, such as for example on a plowed furrow, the measurement of distance fails because only a dual-mode control circuit can be accomplished, which is known to lead to an inadequate work result. Furthermore, pivoting the transmitter about a vertical axis does not improve the measurement. Irrespective of the method of evaluation selected, the average measurement depends on the degree of reflection and the width of the track, and does not reveal the position of the track relative to the implement. Therefore, the apparatus and evaluation of German Patent 2 455 836 are of limited utility in detecting a cultivation edge.

A self-steering device is disclosed in German Patent application 1 95 08 942.1 where a locating device is arranged at a distance above the grain or crop in such a way that the locating signals locate the cultivation edge obliquely from above, approximately perpendicular to the blade of the cutting mechanism. Various locating signals and signal evaluations are disclosed and the cultivated and uncultivated field areas are detected by a locating device via an ultrasound beam or a laser scanner. In a particularly simple embodiment, dual-mode control is accomplished by two laser partial locating beams.

The evaluation of the reception signals is a significant drawback of this particular type of locating device. A laser scanner can be used only for detecting an edge or track which can be detected in the height profile. At frequently occurring storage points in th standing crop, the system fails. Furthermore, to prevent exceeding the maximum working width of the laser beam requires maintenance of a roughly constant scanning distance. When using an ultrasound locating device, the evaluation methods described depend upon the quality of the reference variable. The evaluation and generation of control signals for an automatic steering system requires the capability to evaluate the echoes with the aid of a reference variable. However, this reference variable is not a constant and would have to be varied along the crop edge. The locating device, therefore, delivers satisfactory results for detecting an edge only piecemeal and with high expenditure on correction. However, there is no aptitude for use of the d vice at other kinds of cultivation boundaries.

A further locating device is disclosed in German Patent application 1 95 08 941 in which three partial locating devices are arranged on an agricultural machine. The first locating device is directed onto the harvested field, the second locating device is directed onto the unharvested field and the third locating device is directed onto the edge of the crop material. The reference variable for the third partial locating device is derived from the average of the locating signals of the first and second partial locating devices.

It is a disadvantage for this particular device that the echo of the partial locating signals greatly varies and, thus no satisfactory following of the edge is allowed. The crop density, scanning distance and crop or stubble height affect the partial locating echoes. Necessary integration and averaging of several measurements make it impossible to react to rapid variations in the echo, which can even occur in opposite directions, in such a way that reliably detecting and following the edge is possible. The triple construction of the locating device is also very cost-intensive and requires special synchronization of the transmitting signals. Moreover, this device is unsuitable for locating swathes of crop material. The reference variables determined by the outer partial locating devices do not represent the reference variables needed. The middle partial locating device must be positioned over a swathe in such a way that the beam center lies over the swathe center. This positioning is of course possible, but no edge signal can be generated by the device at the swathe center. A variation in the echo of the middle partial locating device takes place only after the locating beam leaves the swathe of crop material. For detection of a plowed furrow, a partial locating device would be required to determine a reference variable of the bottom of the furrow. However, this is not possible because of the width of the ultrasound beam.

From East German Patent 264 366 another contactless operating locating device is known, which is arranged above the crop edge and converts reflected optical radiation to an electrical position-related signal. The temporarily stored values are then evaluated in an information system according to color or gray stages and converted to a steering signal.

An optical system with this kind of evaluation basically has the drawback that due to different directions of exposure, shadows arise, which are difficult to be distinguished from the crop edge. Furthermore, the arrangement and/or location of attachment has an adverse effect on the steering control circuit due to the small lead. Also, the device is unsuitable for detecting different edges and cultivation boundaries. Often the color variation between cultivated and uncultivated field areas is extremely minimal. Furthermore the accuracy of the device is determined by the number and size of receiving elements and, with sufficient resolution, results in high costs.

Another device is known from German Patent application 197 26 917.6, which corresponds to U.S. application Ser. No. 09/103,431. It discloses a scanning device for detecting contours extending over the ground. A laser scanner attached to a harvesting machine scans the contour by distance measurement in front of a harvesting machine. Changes in distance are determined from the contours and are assigned to a scanning angle. At the point of maximum distance variation a steering difference is determined relative to the associated scanning angle and fed to an automatic steering system.

For use of the device along a swathe, the value with the minimum distance is selected from the measured values as a guide variable. However, this device is suitable only for detecting cultivation boundaries which have a change in height profile. This device fails for cultivation boundaries which do not have these changes, such as at storage points in the standing crop or at soil cultivation boundaries.

It is a general object of the present invention to overcome one or more of the above-described deficiencies.

An object is to provide an apparatus and method which allow reliable detection of the cultivation boundary, below a boundary between a cultivated area, such as an edge of crop, stubble field, freshly loosened soil, wilted material or turf, or a mown edge and the adjoining uncultivated area.

Another object is to provide a device and method which allow the reliable detection of a guide variable.

SUMMARY OF THE INVENTION

Objects of the present invention are achieved by determining at least one cultivation boundary-specific variable from the reflection of a transmitted electromagnetic wave.

In one aspect of the present invention there is provided an agricultural machine including a device for contactless detection of cultivation boundaries or guide variables; an automatic steering system for automatic steering the machine along a guide variable produced by a preceding identical or different operation, which is critical for the subsequent cultivation step; means for mounting the device above the cultivation boundary; and the device including at least one transmitting device for emitting electromagnetic waves in such a way that the cultivation boundaries or guide variables are detected ahead of the machine in the working direction, and at least one receiving device in which there are means which determine the distance from individual wave reflection points; a receiving device for receiving a reflection of the emitted electromagnetic waves; and means for determining at least one cultivation boundary-specific variable from the reflection.

The cultivation boundary-specific variable determines the intensity or the phase shift from the reflection of the transmitted beam. With the aid of this evaluation of the reflection it is now possible to reliably detect cultivation boundaries or guide variables which have only a small height offset or none at all.

Distance variations are caused by differences in height in the contour. A variation in the cultivation boundary-specific variable, such as the intensity or the phase shift, is in most cases produced by a difference in moisture or in structure between the cultivated field area and the uncultivated field area. As a rule, when cultivating a field area, at least one change in one of these measured variables occurs at the cultivation boundary.

Measurements have shown that the electromagnetic wave reflected by a cultivated field area, such as a stubble, turf or freshly loosened soil, differs from the electromagnetic wave reflected by an uncultivated field area. The additional determination of a cultivation boundary-specific variable thus yields an enormous advantage over ordinary distance measurement. Information is available for determining a cultivation boundary or guide variable from several measurable variables for at least one item of cultivation boundary or guide variable.

If no useful signal can be determined when evaluating distance values, such as at storage points in a standing crop, a cultivation boundary or guide variable can be determined at least from the cultivation boundary-specific variable. This also applies to the reverse configuration.

The apparatus embodying the invention for detecting cultivation boundaries or guide variables has universal application and is suitable for detecting different cultivation boundaries and guide variables.

In accordance with another aspect of the invention there is provided a method for determining a cultivation boundary or guide variable for use in automatic steering of an agricultural machine, which method includes the steps of: emitting an electromagnetic wave from a device; receiving a reflection of the electromagnetic wave and evaluating the same according to distance and at least one cultivation boundary-specific variable; storing the individual measured values; calculating individual contours over a working width of the device from the individual measured values; searching measured values of a working width of a device by using a selected evaluation; generating an actual position of the cultivation boundary-specific variable; determining a control difference from a comparison of actual position and nominal position; and generating a correcting variable for automatic steering.

BRIEF DESCRIPTION OF THE DRAWING

Reference is made to the accompanying drawings which illustrate one form of apparatus embodying the invention and for carrying out the steps of the method, and wherein.

DETAILED DESCRIPTION

An electromagnetic wave transmitted by a transmitter device is reflected when it impinges on an object. This reflected wave contains several items of information relating to the reflected object. The distance of the measuring point and the intensity or phase shift can be determined over the course of the signal. These items of information from the reflected wave are evaluated and used to detect a cultivation boundary or guide variable.

Figure 1:
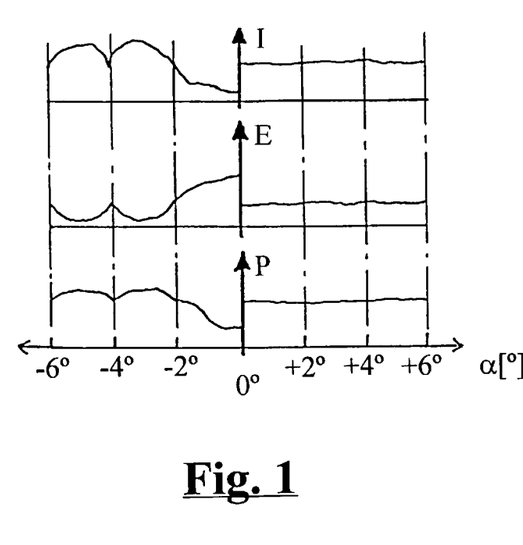
FIG. 1 is a graph which shows the cultivation boundary-specific measured values perpendicularly to a plowed furrow.
Figure 2:
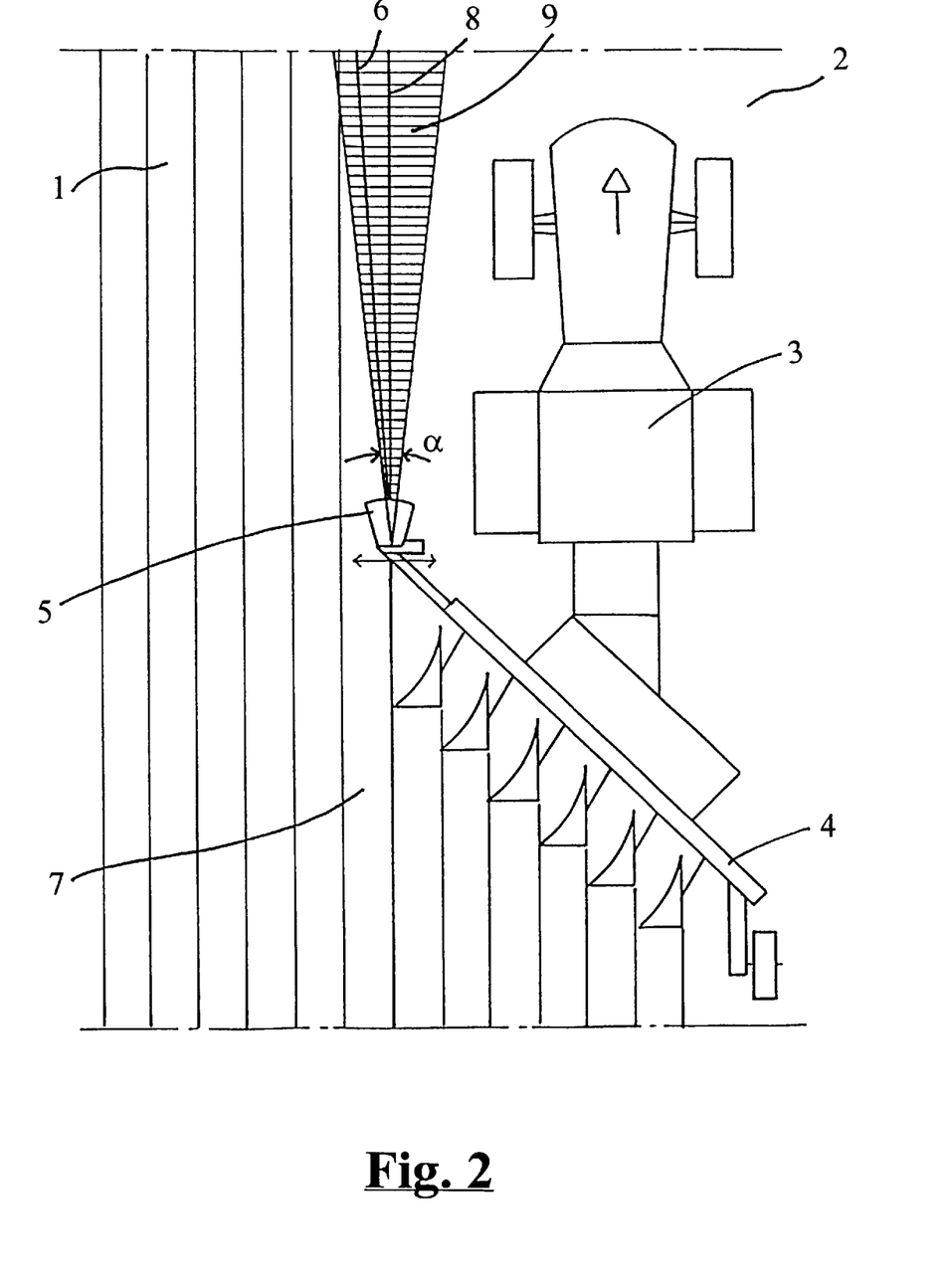
FIG. 2 is a top view of an agricultural tractor with an attached plow and with an apparatus embodying the invention mounted over the plowed furrow.

FIG. 1 shows graphs with cultivation boundary-specific measured values of a plowed furrow. As shown in FIG. 2, a device 5 according to the invention above a furrow is attached to an implement, here a plow 4. The device 5 works with the electromagnetic wave, preferably a laser beam, which is pivoted through a pivot angle $\alpha$ of $\pm 6°$ to the direction of travel. In the lower line graph of FIG. 1 is shown the profile (axis reference P) of a furrow. The section through the cultivated field area 1 can be seen in the range from $-6°$ to $-2°$. From $-2°$ to $-0°$ is shown the depression in the field profile through a furrow. The adjoining field portion from 0° to +6° is the slightly lower-lying uncultivated field area 2.

The associated distance measurement result E of the device 5 is shown in the graph at the middle in FIG. 1. Due to the mounting position on the working machine, raised elevations in the profile P have the effect of shortening the distance. The view of intensity I in the graph at the top in FIG. 1 behaves approximately inversely to the distance measurement graph E. The intensity I of reflection of the laser beam is higher on the cultivated field area 1 than on the uncultivated field area 2.

Only the point at which the greatest change occurs is of interest for evaluation of the values. Therefore the measured values of a working width of the device have been normalized to the lowest value as a reference variable and shown without unity. All following measurements can thus be compared with each other and used to detect the track line.

The pivot angle value $\alpha=0°$ is assigned to the pivot angle a of the laser beam 6, at which the laser beam 6 and the direction of travel of the machine lie parallel to each other. It can be seen from graphs E and I in FIG. 1 that the detected edge and the associated actual position lie directly at a pivot angle of $\alpha=0°$. The working machine accordingly exactly follows the detected guide variable/furrow. A change in direction of travel is therefore unnecessary.

A top view of a tractor 3 with an attached plow 4 is shown in FIG. 2. The tractor 3 is provided with an automatic steering system 3a and processing means 3b which is advantageously an on-board computer or microprocessor. A device 5 is attached to the plow 4 directly over the cultivation boundary 8. The device 5 emits an electromagnetic wave in the direction of travel. This device 5 is pivoted in the pivot range 9 in such a way that the pivot angle $\alpha=0°$ is assigned the center of the pivot range with an axis parallel to the direction of travel.

If, in the arrangement of the device shown, the plow share located at the guide furrow 7 is incorrectly loaded, this can be corrected by sliding the device 5 in the horizontal direction.

When the device is used on a rotary plow, the device is automatically brought to its working position after plow rotation.

Figure 3:
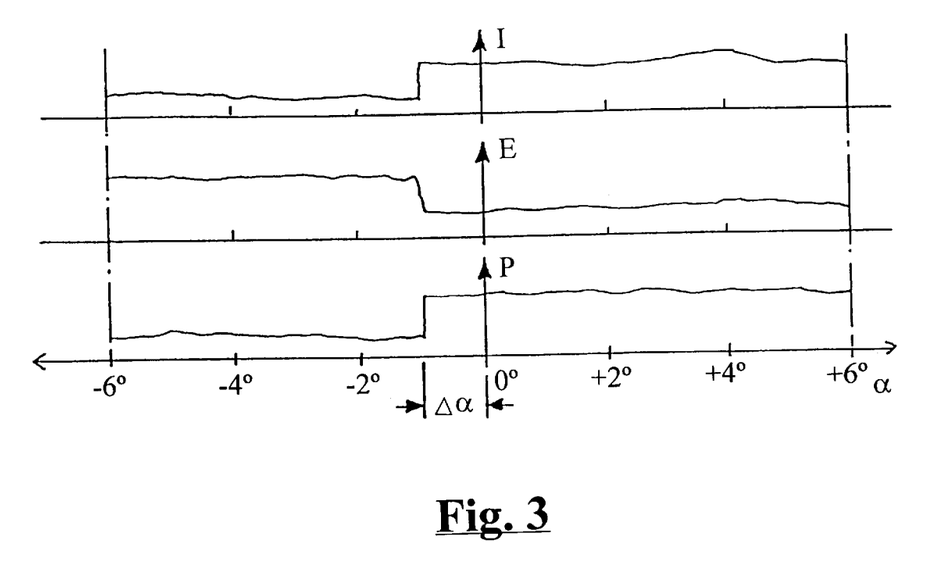
FIG. 3 is a graph which shows the cultivation boundary-specific measured values perpendicularly to a mown edge.

In FIG. 3 are shown graphs similar to FIG. 1. In the lower graph the profile P is shown by a mown edge, referred to a pivot angle range $\alpha$ of a device 5 according to the invention.

The top two graphs of E and I show the results of measurement over a total pivot angle range.

The harvested field area 2 is shown in the range from $-6°$ to $-1°$. The range $-1°$ to $+6°$ is a standing crop 1. The harvested field area is detected by distance measurement E by the larger distance values, and the standing crop 2 is detected by the shorter distance values. Upon evaluation of the intensity, the relationships are represented exactly inversely. The evaluation method determines the changes and assigns them to a pivot angle and calculates the actual position of the cultivation boundary relative to the instantaneous direction of travel.

It can be inferred from FIG. 3 that the instantaneous direction of travel of the harvesting machine 10 and the path of the cultivation edge differ by 1°. Consequently a correcting variable must be generated from this control deviation, allowing the working machine to be returned to its nominal course.

Figure 4:
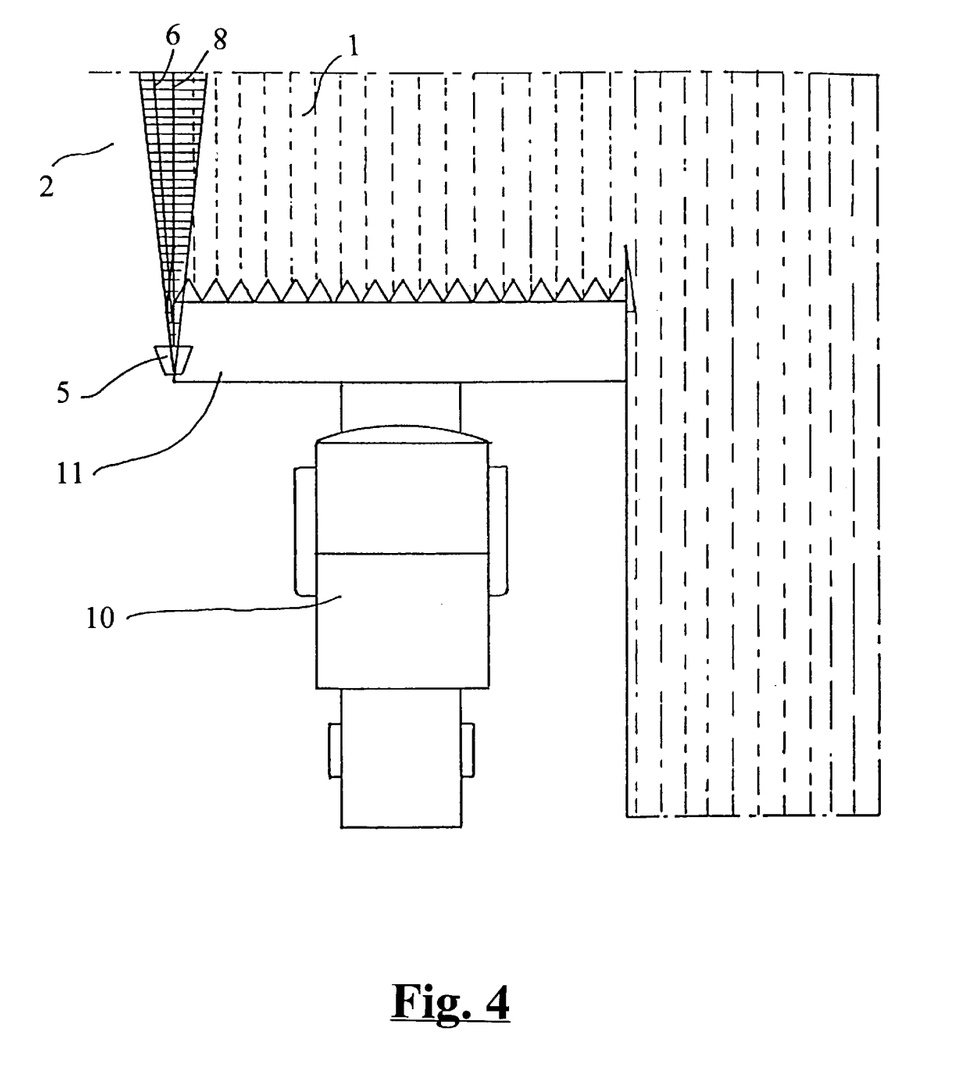
FIG. 4 is a top view of an agricultural harvesting machine with an attached cutting mechanism and with an apparatus embodying the invention mounted over the mown edge.

The top view of a harvesting machine 10 in working use is shown in FIG. 4. The harvesting machine is advantageously a combine having a cutting mechanism 11, an automatic steering system 10a, and processing means 10b in the form of an on-board computer or microprocessor. Attached to the cutting mechanism 11 on the left side is the device 5. The electromagnetic waves, here in the form of a laser beam 6, are pivoted in the direction of travel in front of the cutting mechanism 11 over the cultivation boundary. The location of the mounting of the device 5 is selected on the cutting mechanism 11 in such a way that the center of the working width of the device, with a desired load, on the cutting mechanism lies exactly over the unharvested edge 8.

Figure 5:
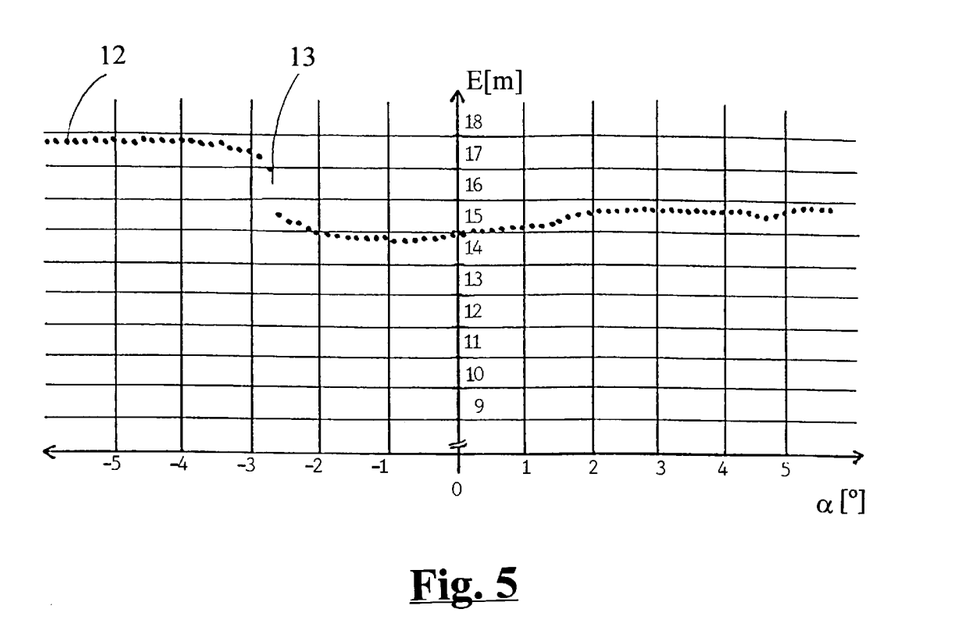
FIG. 5 is a graph showing individual measuring points of the apparatus at a crop edge, plotted over the pivot angle.

In FIG. 5 a measurable variable (here the distance) is represented by individual measured values 12, where the distance value E is assigned to a pivot angle a. By interpolation of the measured values 12, a measurement curve over a pivot range 9 of the device 5 is obtained. The derivation of the distance according to the pivot angle then reveals the relative position of the maximum change in measured value or cultivation boundary to the direction of travel of the harvesting machine. The distance measurement result over a pivot range at a mown edge is shown in FIG. 5. The cultivation boundary here lies at the point of the change of measured value 13 at a pivot angle of about $-2.8°$. As used herein, the term "cultivation boundary" includes not only the plowed edge, the cultivated edge, and the edge left by a seeder or fertilizing machine; but also harvesting boundaries such as a mown edge, and an edge left by a harvesting machine, etc. Hence the word "cultivation" includes all steps in raising crops, from tilling through harvesting.

Figure 6:
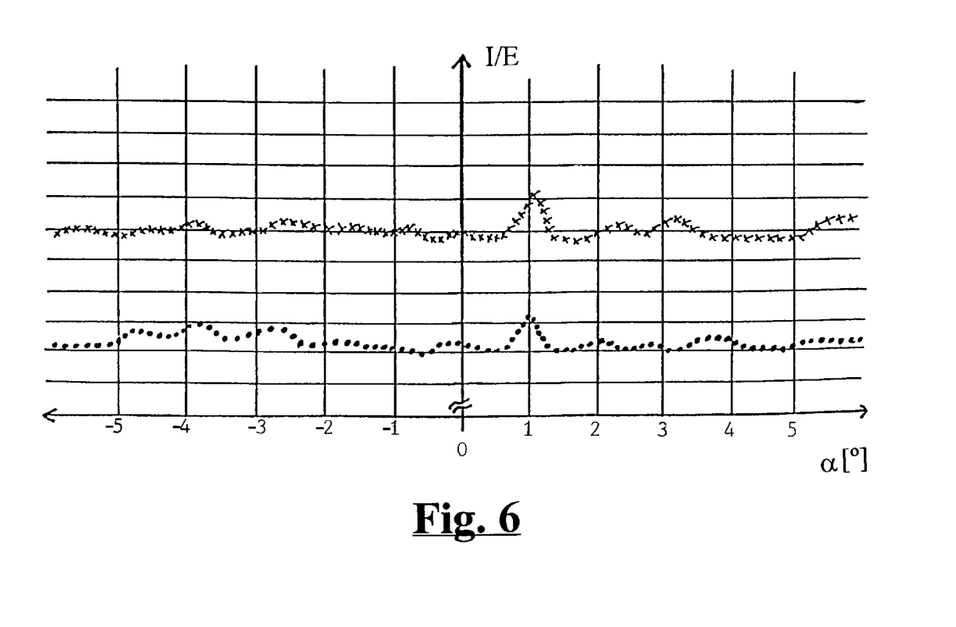
FIG. 6 is a graph showing different measurement results of a track marker track, plotted over the pivot width of the apparatus.

Several measurable values over a working width of the device of two cultivation boundary-specific measurable variables are shown in a graph in FIG. 6. The distance E and the intensity I of each measuring point are shown over the pivot angle $\alpha$. Both measuring curves show a similar, proportional path. At a pivot angle of $\alpha=1°$ both measuring curves have a maximum. Hence it can be inferred that this is a track marker track in an uncultivated field area. The distance value is increased by the depression in the track marker track. At the same point, a higher intensity is determined from the reflection. This is produced by the usually higher moisture in the track marker track.

A simple construction of the device 5 is achieved by a regular arrangement of the receiving unit. The electromagnetic wave transmitted by at least one infrared or light transmitter is reflected by a measuring point and received by several receivers arranged horizontally adjacent each other.

The receiving units are coupled together such that the relative position of the cultivation boundary or guide variable in relation to the implement 4 or 11 can be determined from the individual measured values. The accuracy is based upon the arrangement of the receiving devices. Therefore it is advantageous to combine the receiving units in one housing for improved resolution.

The combination of the receiving units to one device is achieved by a scanner as part of device 5. A transmitting beam is pivoted through a pivot angle of up to 180° about an approximately vertical axis. The device 5 is advantageously mounted such that the transmitting beam extends at the center of the pivot range on an axis located parallel to the longitudinal axis of the machine 3 or 10. The receiving device is then controlled in synchronization with the transmitting beam or adapted to the receiving beam by suitable means, such as by an active pivoting optical system or by means of optical lenses.

As a rule it is endeavored to obtain straight cultivation boundaries. The cultivation boundary or guide variable will therefore always be detectable within a small pivot range of the device 5. An advantageous embodiment of the invention limits the pivot range to a few degrees, for example ±6° about the center of the pivot range. Another advantage arises from the fact that it is possible to work with a higher scan rate, thus improving the resolution of successive contours.

The simplest application of the device 5 delivers the relative cultivation boundary or guide variable position to the point where the device 5 is mounted on the machine attachment or implement 4, 11. The device is mounted in such a way that the transmitting beam detects the track line or cultivation boundary ahead of the implement. Advantageous mounting is achieved by orientation of the center of the measuring range parallel to the direction of travel. As a rule, the center of the working range of the device 5 is selected as a nominal guide variable. The best point of mounting is therefore directly vertically above the cultivation boundary or guide variable. As a result, a change of distance or change of the cultivation boundary-specific variable is best detected in the region of the nominal direction of guiding. Further, deviations from the nominal direction to both sides can be detected as well. In some applications, such as implements with wide working widths and changing directions of cultivation, this optimum mounting is not always possible. Widely projecting holding rod linkages would require high structural expenditure for necessary nearly vibration-free mounting of the device 5 above the cultivation edge or guide variable. The device is therefore mounted on the implement or tractor at a distance from the cultivation boundary or guide variable. The center of the working range of the device 5 and the edge of the cultivation tool or track marker furrow (see FIG. 6) are then spaced apart from each other, with parallel orientation of the transmitting beam. In order for the working machine to follow the cultivation boundary or guide variable at a suitable distance, the determined cultivation boundary position must be corrected with an offset and only then fed to an automatic steering system.

When working on a slope, tractors 3 and implements, such as 4, set themselves slightly transversely to the slope to compensate for the downward forces of the slope. For this purpose, the machine turns about its center of gravity without changing the direction of travel in the process. All machine parts spaced apart from the center of gravity change their relative position to the direction of travel. As a rule, the device 5 is mounted at a distance from the center of gravity of the machine. Also the distance of the center of the measuring range is no longer parallel to the direction of travel. A control difference is determined. Correction of the nominal value or actual value by an offset entered manually equalizes this control difference.

Control differences caused by a relative change in mounting position can also be eliminated by a further embodiment. Thus, there is provision for manually or automatically altering the mounting position and/or inclination. The position of the mounting of the device 5 can be altered by known means such as a servomotor such that the control differences are equalized.

Further, it becomes necessary to change the direct mounting of the device 5 on implements with different working heights or depths. In order to roughly maintain the view ahead of the device 5, or to at least prevent the scanning beam from leaving the cultivation field in the working position, it may become necessary to correct the height of attachment or inclination of the device 5. This can be done automatically by a control device (not shown) after measurement of the working height or depth or by manual adjustment.

When the device is used in combination with a soil cultivation implement, such as plow 4, a change in horizontal position is advantageous when an altered overlap with the previous cultivation track is desired. For this purpose, the device 5 is displaced with a servomotor closer to the center of the tractor 3. As a result, the nominal guide variable is displaced and the automatic steering system 3a causes the machine (i.e. tractor 3 and plow 4) to be guided with an altered relative nominal guide variable along the cultivation boundary or guide variable.

A further embodiment achieved by incorporating the device 5 into a field end or start system 3c. The start or end of a cultivation boundary or guide variable is derived from the cultivation boundary paths or guide variables and transmitted according to an automatic system via known communication means. The automatic field start system 3c is activated when the device detects a cultivation boundary or guide variable. This is conveyed to the operator and, after passage of a particular time or distance, the automatic system 3c is started. For example, the implement is lowered and/or the power take-off shaft is engaged.

In a still further embodiment there is a provision for storing the individual measurable variables in the microprocessor 3b or 10b in combination with a relative or absolute position. The high-precision GPS locating systems which exist today allow the respective reflection measurements to be stored in combination with a correction of position of attachment and assigned to an absolute position (X, Y, possibly Z coordinates). In a simplified form it is sufficient to store the measurable variables in combination with a relative quantity, such as the scanning angle or, with an array of receiving devices, the number or position of the receiving device.

The device 5 can communicate with another electronic evaluation system, the automatic steering system 3a or 10a, or the field end or start system 3c via a known means of communication such as a CAN bus connection.

The device 5 is applicable to various implements or agricultural machines with different cultivation cycles. Therefore the device 5 may be provided with various methods of calculation for generating cultivation edges or guide variables. The operator of the device selects the desired application via a manual input interface, for example a keyboard, a rotary switch or a button. The method of calculation required is then selected accordingly in the device. Similarly the operator of the device can convey, by known means, that the method of calculation is to be reselected automatically.

In another step it is provided that selection of the method of calculation is cyclical or under the control of a variable dependent upon the cultivation process. It is conceivable to activate a selection method by lowering the cutting mechanism 11 or by engaging the power take-off shaft.

By the combination of individual measurable variables, even in the case of curves which are difficult to analyze, it becomes possible to reliably detect a guide track. For example, here both curves have a maximum value at the same point.

A preferred method includes the following steps:

emission of an electromagnetic wave;

reception of the reflected electromagnetic wave and evaluation according to distance or according to at least one cultivation boundary-specific variable;

storage of the individual measured values;

calculation of individual contours over a working width of the device from the individual measured values;

searching measured values of a working width of the device by a selected evaluation method;

generation of an actual position of the cultivation boundary or guide variable;

determining the control difference from the comparison of the actual position/nominal position; and generating a correcting variable for the automatic steering system 3*a* or 10*a*.

The electromagnetic wave by device 5 is reflected by a contour point and received by the device. From the received signals the distance and at least one cultivation boundary-specific variable are determined and stored.

The measured values over the working width of the device 5 are selected from the individual measurable variables. A contour is then calculated from the measured values. These individual contours can be temporarily stored again as required. With the aid of the selected evaluation method, the individual contours or series of measurements are searched and the position of the cultivation boundary or guide variable is generated. A control difference is determined from the comparison of the nominal position with the measured actual position and a correcting variable is derived for a subsequent automatic steering system 3*a* or 10*a*. The method reliably determines a cultivation boundary or guide variable and makes it possible for the working machine 3 or 10 to be guided reliably along a cultivation boundary or guide variable.

In a further embodiment it is provided that during evaluation of the measurable variable, no absolute reference variable is used, but at least one measurable variable is selected as a reference variable and used for evaluation. During normalization of the measured values of a measurable variable, the lowest distance value, for example, is taken as one and the highest distance value as zero. By this normalization all height contour variations are normalized to a range of variation about 0.1. The actual height change is no longer significant and subsequent evaluation requires no further adaptation. Distance variations due to a pitch movement or uphill or downhill movement of the working machine are eliminated by the normalization.

Another normalization can be used for normalization of the cultivation boundary-specific variable. In this case the measured values of a measurable variable are normalized to a reference variable at a given scanning angle. An example is the normalization of the measured values over a working width of the device to the extreme left measured value. When harvesting an area of a cornfield clockwise, all measured values would be normalized to a measured value which comes from reflection of an electromagnetic wave on a stubble field area. For example, by these methods, fluctuations in a cultivation boundary-specific variable along a cultivation boundary or guide variable are eliminated.

If significant fluctuations in the reference variable occur, plausibility testing is performed and, if necessary, a reference variable is averaged, rejected and exchanged for a preceding one.

The fields of application of the device are various cultivation boundaries or guide variables. Therefore the device must include various evaluation methods. These methods can be selected, as already mentioned, manually or automatically. For automatic selection of an evaluation method, the measured values are searched for a given allocation of measured values. By way of example a method of selection will be described below.

First, only measured values of a measurable variable over a working width of the device are searched for the highest or lowest measured value and its relative position and locations are stored. Furthermore the measurable variables of a working width of the device are searched for the highest change in measured value and their relative position. In a further embodiment of the method it is possible to search only for changes with given signs.

If the selection method determines a maximum or minimum value in only one region, this is a cultivation boundary or guide variable with a depression or elevation in the contour. It can then be assumed that it is a furrow, track marker track or a swathe.

If only one region with minimum values can be determined over a working width of the device, the detected cultivation boundary or guide variable is a guide variable at a distance from the ground, such as a swathe, for example.

If only one region with maximum values can be determined over a working width of the device, the detected cultivation boundary or guide variable is a ground indentation, such as a track marker track or furrow.

Next, the position of the highest measured value is compared with the position of the highest change in measured value, with selection of the sign, if any. If these are close together, it is a furrow.

If no region within a working width of the device with minimum or maximum values can be determined from the measured values of a measurable variable, but a change of distance can be determined, then it is a cultivation edge.

If no unambiguous cultivation boundary or guide variable could be determined from the distance values, evaluation of the cultivation boundary-specific variable provides a further selection aid. In subsequent steps of the method, the cultivation boundary-specific variables are searched for minimum or maximum values and changes with selection of sign, if any, within a working width of the device. If suitable points are found they are compared with the previous method selection criteria.

If only one region with minimum or maximum values can be determined over a working width of the device, it is an indication that there is an altered surface structure and/or a change of moisture. Therefore, at this point it is likely that there exists a track marker track, a furrow or a swathe. If the decision criteria from distance measurement are then considered, an unambiguous selection of evaluation method can be made.

If a deviation in the quantity is determined, rather than a minimum or maximum value, in a region of the working width of the device, it is evident that there is a cultivation boundary such as a grain edge or an edge between wilted material and grass stubble. If the distance measurement at this point also shows a deviation, then there is a cultivation boundary in the form of an edge, such as a grain edge or a furrow.

If no change could be determined at this point from the distance measurement, no change in height contour takes place at the cultivation boundary. The selection criteria used for selection of an evaluation method are also used to detect the actual position of the cultivation boundary or guide variable.

With the aid of the selected evaluation method the actual position of the known cultivation boundary or guide variable can then already be derived from just one search of a measurable variable. For instance, for the evaluation method for detection of a cultivation edge, an edge can already be determined from the change in distance measurement. This result is confirmed by determination of a further change which as a rule exists in the cultivation boundary-specific variable. If no actual position can be determined from a measurable variable, there is recourse to the other criterion used in the selection method.

Another embodiment of the method lies in that, if several actual positions are determined from several searches of measurable variables, these are compared with each other and if occasion arises offset against each other. Alternatively, a result is selected with the aid of plausibility tests.

To obtain even greater reliability, there is also provision for comparing previous actual positions with the current result and, if necessary, correcting the latter. Advantageously there is then determination of the edge path from several stored working width contours of the device. They then also allow prediction of the edge position which probably follows.

In another embodiment of the method, an end or start of the cultivation boundary or guide variable is generated from the measured values.

If the evaluation method cannot determine an actual position of the cultivation boundary or guide variable, the working machine has arrived at the end of the cultivation field. By looking ahead of the device 5, the end of the field is already detected before reaching the implement such as 4 or 11. Since one has to continue working until reaching the end of the field, the automatic steering system 3a or 10a is further steered with a maintained steering signal as far as the end of the field. An automatic field end device is then activated at the end of the cultivation strip by a timing member or measurement of distance traveled or an activation correcting order (for example turning a steering wheel). To prevent possible wrong decisions of field end detection, field end detection is conveyed to the operator. He then has the option to deactivate the automatic device before reaching the end of the field. The automatic field end device automatically sets various machine cycles in motion. For example, the cultivation implement is lifted and after a certain time the power take-off shaft is disengaged.

If a cultivation boundary or guide variable is detected by the device, by the selected evaluation method, an automatic field start device is activated. The operator of the working machine 3 or 10 has this information conveyed to him. By looking ahead of the device, the cultivation boundary or guide variable is detected at the start of the field before the machine reaches it. The automatic steering system 3a or 10a can be automatically engaged immediately if necessary. Until the working machine 3 or 10 reaches the start of the field, the automatic field start device can make certain machine adjustments. The machine operator also has the option of deactivating the automatic device. For the correct field start cycle, control dependent upon the distance, time or function may be necessary.

The actual position of a cultivation boundary or guide variable determined from the measured values is then used for automatic steering of an implement, such as 4, or harvesting machine 10 along a cultivation boundary or guide variable.

The generated actual position is compared with a nominal guide variable and from this information, a control difference may be derived. By a further method, the actual position, the nominal position or the control difference can then be corrected by incorporating an offset. This becomes necessary so that effects of downward drift of the working machine on a slope, the location of mounting the device or a change of working width, can be eliminated from the measured actual position. The quantity of the offset is determined by manual presetting or by automatic determination of parameters, and taken into consideration when determining the correcting variable for the automatic steering system 3a or 10a.

As a rule the intensity of reflection decreases with increasing distance. An increase can be recorded with increasing moisture. The intensity of reflection of a freshly cultivated field area or a freshly dug track is therefore higher than the surrounding uncultivated field area. At cultivation boundaries, where the cultivation boundary-specific variable and the distance are proportional to each other, e.g. a track marker track, the orientation of the device is controlled or regulated by a method such that the mounting position or inclination of the device is varied so that at least one measured variable is nearly constant. As a result, at least one cultivation boundary characteristic is reinforced such that improved detection of the cultivation boundary or guide variable is ensured.

In a further step, the measured distance values and the associated cultivation boundary-specific variables are assigned to an absolute or relative position and stored. Thus, it is possible to represent on a map the cultivation boundaries or guide variables followed when cultivating a field area. With the aid of these records the actual working width of the implement, the actual plot boundary path or a guide variable for subsequent operations can then be determined.

Other objects, features and advantages will be apparent to those skilled in the art. While preferred embodiments of the present invention have been illustrated and described, this has been by way of illustration and the invention should not be limited except as required by the scope of the appended claims.

I claim:

1. In an agricultural machine including a device for contactless detection in a working direction of cultivation boundaries or guide variables; an automatic steering system for automatically steering the machine along a guide variable produced by a preceding operation, which is critical for a subsequent cultivation step; means for mounting the device above the cultivation boundary; and the device including at least one transmitting device for emitting electromagnetic waves in such a way that the cultivation boundaries or guide variables are detected ahead of the machine in the working direction, and at least one receiving device having means for determining a distance from individual wave reflection points; the improvement comprising:

a receiving device for receiving a reflection of the emitted electromagnetic waves, and means for determining at least one cultivation boundary-specific variable from the wave reflection.

2. A device according to claim 1, wherein an intensity is determined from said wave reflection as a cultivation boundary-specific variable.

3. In an agricultural machine including a device for contactless detection in a working direction of cultivation boundaries or guide variables; an automatic steering system for automatically steering the machine along a guide variable produced by a preceding operation, which is critical for a subsequent cultivation step; means for mounting the device above the cultivation boundary; and the device including at least one transmitting device for emitting electromagnetic waves in such a way that the cultivation boundaries or guide variables are detected ahead of the machine in the working direction, and at least one receiving device having means for determining a distance from individual wave reflection points; the improvement comprising:

a receiving device for receiving a reflection of the emitted electromagnetic waves and means for determining a phase shift from said wave reflection as a cultivation boundary-specific variable.

4. A device according to claim 1, wherein the transmitting device and the receiving device are used in an array.

5. A device according to claim 4, including means for scanning one of said transmitting device and said receiving device.

6. A device according to claim 5, wherein a working width of said scanned device can be adapted to a particular application and comprises scanning angle degrees in the range of ±6° from the a center point of the working width.

7. A device according to claim 1, including means for automatically selecting a calculation method for generating the cultivation boundary or guide variable.

8. A device according to claim 1, including means for manually selecting a calculation method for generating the cultivation boundary or guide variable.

9. A device according to claim 1, including means for feeding the position of said cultivation boundary directly to the automatic steering system.

10. A device according to claim 1, including means for allowing the position of said cultivation boundary to be corrected by an offset.

11. A device according to claim 1, including means for calculating a location for said cultivation boundary.

12. A device according to claim 1, including means for feeding and correcting the cultivation boundary directly to the automatic steering system.

13. A device according to claim 1, including means for mounting said transmitting and receiving devices for adjustment in at least one direction of inclination.

14. A device according to claim 1, including an automatic field end and start device, and means for detecting the end and start of the cultivation boundary and then conveying this to a driver and feeding it to the automatic field end and start device.

15. A device according to claim 1, including means for storing measured distance values and associated cultivation boundary-specific variables, in combination with an absolute position.

16. A device according to claim 1, wherein there are devices for storing measured distance values and associated cultivation boundary-specific variables, in combination with a relative position.

17. A method for determining a cultivation boundary or guide variable for use in automatic steering of an agricultural machine, which method includes the steps of:

a) emitting an electromagnetic wave from an emitting unit;

b) receiving a reflection of the electromagnetic wave with a recieving unit, and evaluating the reflected electromagnetic wave according to distance and at least one cultivation boundary-specific variable to produce individual measured values;

c) storing the individual measured values;

d) calculating individual contours over a working width of the device from the individual measured values;

e) searching measured values of a working width of a device by using a selected evaluation method;

f) generating an actual position of the cultivation boundary-specific variable;

g) determining a control difference from a comparison of actual position and nominal position; and h) generating a correcting variable for automatic steering.

18. A method according to claim 17, wherein measured values of a working width of said device are evaluated in a form normalized to at least one associated measured value.

19. A method according to claim 17, wherein an evaluation method is automatically selected for detecting said cultivation boundary.

20. A method according to claim 17, wherein an evaluation method is selected according to an allocation of measurable values by searching said measurable values over a working width of the device for points with the greatest change of measured value.

21. A method according to claim 17, wherein the actual position of said cultivation boundary is derived by a combination of properties of measurable variables over at least one working width of the device.

22. A method according to claim 17, wherein for reliable detection of a cultivation edge said measurable values, over at least one working width of the device, are searched for a position with a highest change in a cultivation boundary-specific variable and for a position with a highest change in distance measurement.

23. A method according to claim 22, wherein in case of approximate matching of two changes in said cultivation boundary-specific variable, the position of the highest change in distance measurement is selected as the actual position.

24. A method according claim 20, wherein said position of the highest change in distance measurement is selected as the actual position if it can be selected from only one measurable variable.

25. A method according to claim 17, wherein a termination point of said cultivation boundary is determined from the measurable variables.

26. A method according to claim 17, wherein a starting point of said cultivation boundary is determined from the measured variables.

27. A method according to claim 25, wherein said termination point of the cultivation boundary is indicated to a machine operator.

28. A method according to claim 25, wherein said detected end of the cultivation boundary automatically activates a field end device.

29. A method according to claim 26, wherein the starting point of the cultivation boundary is indicated to a machine operator.

30. A method according to claim 26, wherein said start of the cultivation boundary automatically activates a field start device.

31. A method according to claim 17, wherein a measured actual position of said cultivation boundary is fed directly to an automatic machine steering system.

32. A method according to claim 31, wherein the measured actual position of said cultivation boundary is fed with an automatic correction.

33. A method according to claim 31, wherein the measured actual position of said cultivation boundary is fed with manual correction.

34. A method according to claim 17, including a mounting position contained in said emitting and receiving units, and wherein said emitting and receiving units are regulated in their mounting position in such a way that at least one measured cultivation boundary-specific variable is kept constant.

35. A method according to claim 17, wherein said distance and the cultivation boundary-specific variable are assigned to a position and stored.

36. In an agricultural machine including a device for contactless detection in a working direction of cultivation boundaries or guide variables; an automatic steering system for automatically steering the machine along a guide variable produced by a preceding operation, which is critical for a subsequent cultivation step; means for mounting the device above the cultivation boundary; and the device including at least one transmitting device for emitting electromagnetic waves in such a way that the cultivation boundaries or guide variables are detected ahead of the machine in the working direction, and at least one receiving device having means for determining a distance from individual wave reflection points; the improvement comprising:

a receiving device for receiving a reflection of the emitted electromagnetic waves, means for determining at least one cultivation boundary-specific variable from the wave reflection, and means for selecting a calculation method for generating the cultivation boundary or guide variable.

* * * * *